No. 889,720. PATENTED JUNE 2, 1908.
T. ROBINO.
VEHICLE BRAKE.
APPLICATION FILED NOV. 27, 1907.
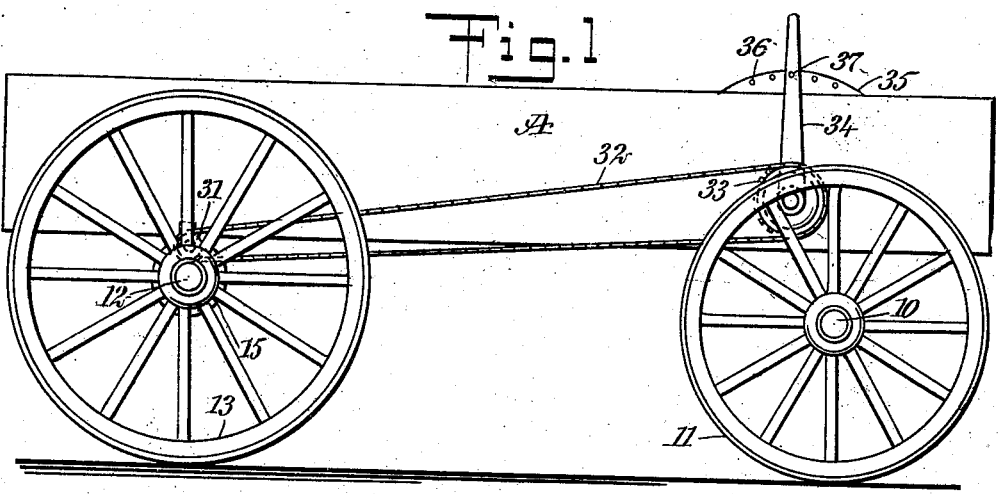
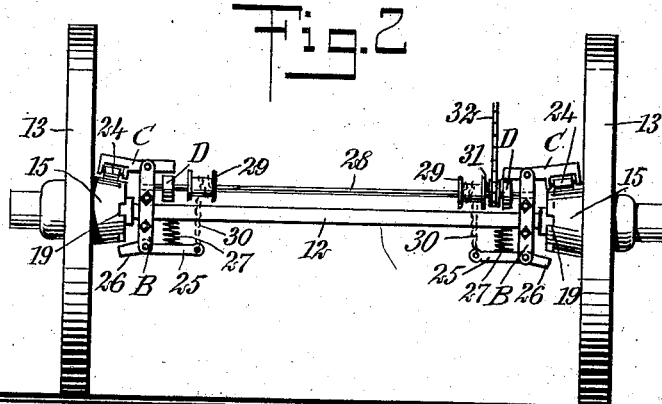
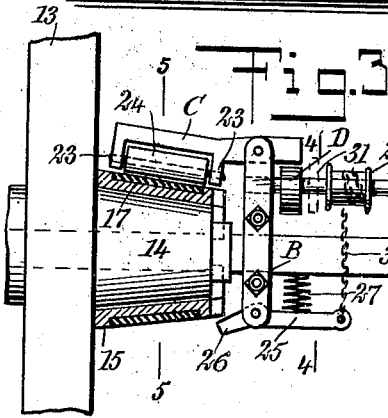
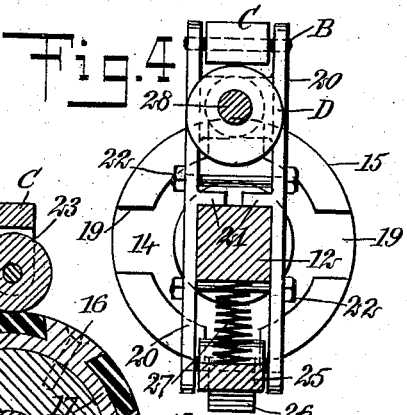
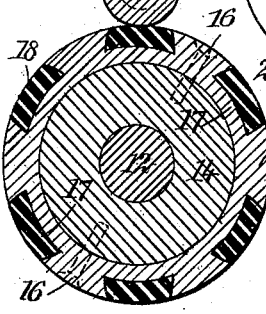
WITNESSES
INVENTOR
Thomas Robino
BY
ATTORNEYS

UNITED STATES PATENT OFFICE.

THOMAS ROBINO, OF HAZLETON, PENNSYLVANIA.

VEHICLE-BRAKE.

No. 889,720.      Specification of Letters Patent.      Patented June 2, 1908.

Application filed November 27, 1907. Serial No. 404,061.

*To all whom it may concern:*

Be it known that I, THOMAS ROBINO, a citizen of the United States, and a resident of Hazleton, in the county of Luzerne and State of Pennsylvania, have invented a new and useful Improvement in Vehicle-Brakes, of which the following is a full, clear, and exact description.

The purpose of the invention is to provide a simple, economic, and quick-acting brake that can be readily and conveniently applied to any vehicle, and one wherein the braking action is upon the hubs of the wheels.

It is a further purpose of the invention to protect that portion of a hub to which the brake is applied, and to provide such protective agent with inserted material adapted to increase the resistance between it and the brake, and it is also a purpose of the invention to securely lock the wheels against turning when the brakes have been fully applied.

Figure 1 is a side elevation of a wagon having the improved brake applied; Fig. 2 is a view of the rear axle of a vehicle, the wheels mounted thereon, and the improved brake in position for application to the hubs of the wheels; Fig. 3 is an enlarged side elevation of the brake mechanism and hub of a wheel, and a sectional view of the protective sleeve of the hub to which the brake is directly applied; Fig. 4 is an enlarged transverse section taken practically on the line 4—4 of Fig. 3; and Fig. 5 is an enlarged transverse section taken substantially on the line 5—5 of Fig. 3.

A represents the body of a wagon provided with the usual front axle 10 and accompanying wheels 11, and rear axle 12 and accompanying wheels 13, the wheels being mounted to turn loosely on the axles. The inner portions 14 of the hubs of the rear wheels 13 are provided with sleeves 15 secured to them an any suitable or approved manner, as for example, by screws 16, as is illustrated in Fig. 5, and each sleeve 15 is provided with diametrical pockets 17 formed in its outer face, said pockets being predetermined intervals apart, and a strip 18, of rubber, rawhide, or the like, is introduced and secured in each of said pockets 17, the outer faces of the strips being flush with the outer peripheral face of the sleeve containing them, as is clearly shown in Figs. 3 and 5, and in the further construction of each sleeve 15, two or more recesses 19 are made in the inner end of the sleeve, which project beyond the inner end of the hub to which the sleeve is applied, and usually these recesses 19 are four in number, as is illustrated. I desire it to be understood that the strips may be omitted from the sleeves, if so desired.

A brake is applicable to the sleeve of each rear wheel, and the brakes are of the same construction. Each brake consists of a clip B, which usually comprises parallel bars 20 that extend above and below the axle 12, as is particularly shown in Fig. 4, the said bars being provided with inwardly extending lugs 21 between their ends, that rest upon the upper face of the axle 12, and the bars 20 are connected by bolts 22, located above and below the axle, as is also shown in Fig. 4. Each clip B is adapted to carry a brake-shoe C at its upper end. This brake-shoe is pivotally mounted between the bars 20 of the clip, as is particularly shown in Fig. 3, and one end of the shoe extends inwardly a short distance beyond the inner edge of the clip, while the body portion of the shoe extends over the sleeve 15 on the hub, and the body portion of the shoe C is provided with downwardly-extending ears 23, in which ears the trunnions of a roller 24 are mounted to turn, the said roller being adapted to travel along and engage with the outer face of a sleeve 15, over which the shoe is located, engaging particularly with that portion of the sleeve containing the inserted strips 18. The brake-shoe C and its roller 24 are preferably made of metal.

At the lower end of the clip B, a lever 25 is pivoted between the bars 20 of the clip, the pivot point of the said lever being between its center and its ends, and the longer portion of the lever extends inwardly below the axle 12, while its outer or shorter end 26 is preferably bent downward and is adapted when a brake is applied, to enter a recess 19 in the sleeve 15 upon which the brake has bearing, and thus lock said sleeve from turning and consequently the wheel to which the sleeve is secured. A spring 27 has bearing upon the upper edge of the longer portion of the lever 25 and against the under face of the axle 12, and this spring when in action serves to automatically carry the short end 26 of the lever, which acts as a pawl, into a recess 19 of the sleeve 15 presented to said pawl.

A shaft 28 extends from one clip to the other above the axle 12, and the ends of the said shaft are journaled in suitable bearings located between the members 20 of the clip, and the said shaft is provided adjacent to each clip with an attached drum 29, and a chain 30 is secured to each drum and is attached to the inner end portion of the lock lever 25. The shaft 28 also carries two cams D and these cams are located immediately beneath the inwardly extending or shorter end portions of the brake shoes C. A sprocket wheel 31 is likewise secured on the shaft 28, located preferably between a drum 29 and a cam D, and an endless chain belt 32 is passed over the sprocket wheel 31 and over a larger sprocket wheel 33, that is mounted to turn at the side of the vehicle at its front portion, and the said sprocket wheel is provided with an attached lever 34.

When the lever 34 has been turned in a direction to cause the endless chain belt 32 to turn the shaft 28 to wind the chains 30 on the drums 29, the lock levers 25 will be carried to their normal position, that is with their pawl terminals 26 out of the path of the sleeves 15 as the rear wheels revolve, and the cams D out of engagement with the brake shoes C. This is the normal position of the brake mechanism, the roller 24 running idly upon the sleeves 15, and at such time the springs 27 bearing on the levers 25 are placed under compression. When the brakes are to be applied the lever 34 is moved in an opposite direction, turning the shaft 28 in such manner as to bring the rising portion of the cams in engagement with the inner ends of the shoes C, thus forcing the rollers 24 carried by said shoe in firm frictional engagement with the sleeves 15. When the shaft 28 has been turned sufficiently to bring the point of the cams in engagement with the said shoes, thus causing the shoes to exert the greatest amount of pressure on the sleeves 15, the chains 30 will have been unwound from the drums 29 sufficiently to permit the springs 27 to expand and carry up the pawl terminals 26 of the levers 25 to a position where they will enter the first recess in a sleeve presented to them, thus firmly locking the rear wheels against rotation.

I desire it to be understood that the sprocket wheel 31 may be duplicated at the opposite side of the shaft if desired, or that a sprocket wheel 31 may be located at any point in the length of the shaft 28 that is found most expedient.

The lever 34 is provided with a rack 35 secured to the vehicle, and the said rack is shown as provided with apertures 36 adapted to receive a pin 37 carried by the lever 34 for the purpose of holding the said lever 34 in its adjusted position, but it will be understood that any desired locking means may be employed relatively to the said lever.

Having thus described my invention, I claim as new and desire to secure by Letters Patent,—

1. In a vehicle brake, the combination with a wheel, of a brake lever for engaging the hub of the wheel, a shaft, means for operating the brake lever from the shaft, means for operating the shaft, a lever for engaging the hub of the wheel to lock the same, and a connection between the shaft and lever, whereby the lever is permitted to move into locking engagement with the hub when the brake has been fully applied.

2. In a vehicle brake, the combination with a wheel having a hub provided with notches, of a pivoted brake lever for engaging the hub, a shaft, a cam on the shaft for operating the brake lever, a pivoted and spring pressed lever adapted to engage the notches of the hub, and a connection between the shaft and said lever to permit the lever to engage a notch of the hub when the brake has been fully applied.

3. In a vehicle brake, the combination with a wheel having its hub provided with notches, of a pivoted brake lever for engaging the hub, a shaft, a cam on the shaft for operating the brake lever, a pivoted and spring pressed lever for engaging the notches of the hub, a drum on the shaft, and a flexible connection winding on the drum and connected with the lever.

4. In a vehicle brake, a pivoted brake shoe, a support therefor adapted for attachment to an axle of a vehicle, the inner end portion of the shoe being shorter than its outer or body portion, a shaft journaled in said support, a cam carried by the shaft adapted for engagement with the shorter end of the brake, a sprocket secured to the shaft, a second sprocket adapted to be mounted upon the vehicle, a belt connecting the sprockets, and means for manually rotating the said second sprocket.

5. In a vehicle brake, a sleeve fitted for attachment to the hub of a wheel, a support adapted for attachment to the axle upon which the hub is mounted, a brake shoe pivoted upon the said support for movement to and from the said sleeve, having a shorter end extending at one side of the support, and a body portion adapted to extend over the sleeve, a shaft mounted to revolve relatively to the sleeve, a cam carried by the shaft adapted for engagement with the short end of the brake shoe, means for manually rotating the shaft, a locking device for the sleeve, and means for controlling said locking device by the rotation of said shaft.

6. In a brake mechanism for vehicles, a sleeve fitted for attachment to the hub of a wheel, which sleeve is provided with strips of yielding frictional material inserted in its exterior face, a support adapted for attachment to the axle upon which the hub is mounted, a brake shoe pivoted upon the said support for movement to and from the sleeve having a short end extending beyond the inner portion of the said support, and a body portion adapted to extend over the sleeve, a roller in the said body portion, a shaft mounted to revolve relatively to the shoe, a cam carried by the shaft adapted for engagement with the short end of the brake, means for manually turning the shaft, a locking device for the sleeve, and means for controlling the said locking device by the rotation of the said shaft.

7. In a brake mechanism for vehicles, the combination with an axle of the vehicle, a hub of a wheel mounted on said axle, and a sleeve secured to the said hub, extending beyond the inner end of the hub and provided with recesses at its extending end, of a support secured to the axle, a brake shoe pivoted in said support, the body of the brake shoe extending over the said sleeve, the said brake being provided also with a short inwardly extending end, a roller in said brake shoe, a shaft mounted in the said support, a cam carried by the shaft adapted for engagement with the shorter end of the shoe, a spring-controlled lever likewise pivoted in the said support having one end adapted to enter the recess in the said sleeve, and a flexible connection between the said lever and the said shaft whereby when the shaft is turned in one direction the spring controlling the lever is placed under compression, and when the shaft is turned in a contrary direction the lever is in position for engagement with the recessed portion of the sleeve.

In testimony whereof I have signed my name to this specification in the presence of two subscribing witnesses.

THOMAS ROBINO.

Witnesses:
  JOHN W. SEAGER,
  WM. H. BITTENFINDER.